Patented Sept. 15, 1931

1,823,528

UNITED STATES PATENT OFFICE

WOLFGANG BUELOW, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY

PRODUCTION OF GLYCOLLIC ACID ESTERS

No Drawing. Application filed August 19, 1930, Serial No. 476,445, and in Germany September 10, 1929.

The present invention relates to the production of glycollic acid esters.

Hitherto, for the manufacture and production of glycollic acid esters, free glycollic acid has been esterified with alcohols in the presence of a small amount of mineral acid, the initial material either being free glycollic acid or alkali metal salts of chloracetic acid which were converted either by the action of a base and consequent treatment with an acid or by heating the salts containing water of crystallization into free glycollic acid during the course of the process.

I have now found that glycollic acid esters are obtained in a more simple manner by heating the dry alkaline salts of chloracetic acid, i. e. alkali metal and alkaline earth metal salts of this acid, which are free from water of crystallization, with aliphatic alcohols without employing an esterifying agent.

When employing sodium chloracetate and ethyl alcohol for example, the reaction proceeds according to the following equation:

$$CH_2Cl.COONa + C_2H_5OH = CH_2OH.COOC_2H_5 + NaCl.$$

In order to obtain as high a yield of the desired ester as possible and in order to avoid the formation of free glycollic acid it is preferable to work with alcohols which are as free from water as possible. The temperatures of working are generally at about 100° C. or above that temperature, and on working with alcohols having a boiling point below 100° C. the reaction is preferably carried out in a closed pressure-tight vessel. When working, however, with alcohols having a boiling point above about 100° C. the reaction can be carried out at the boiling point of the alcohol employed in a vessel provided with a reflux condenser. Contrasted with the methods of working hitherto known, the process according to the present invention, in addition to the simplicity of working it on an industrial scale and the smooth course of the reaction, has the advantage that, in view of the absence of acids, special acid resisting material is not necessary for the vessels for the conversion. The process according to the present invention allows to obtain esters of aliphatic alcohols of any kind such as ethyl, butyl, allyl alcohols, glycols or glycerols and cyclohexanols which are cycloaliphatic alcohols and therefore included in the term aliphatic alcohols.

The following examples will further illustrate the nature of this invention, but the invention is not restricted to these examples.

Example 1

19 kilograms of chloracetic acid, preferably diluted with a little water, are neutralized with potassium carbonate while cooling and then from 40 to 50 liters of normal butyl alcohol are added. The mixture is subjected to a distillation under reduced pressure in order to obtain a dry material, free from water of crystallization. From the mixture of butyl alcohol and water which passes over, the butyl alcohol can be recovered and used for the subsequent esterification by leading it back continuously into the reaction vessel by means of a siphon while the water is continuously withdrawn from the bottom of the receiver.

As soon as all the water has been removed, the suspension of anhydrous potassium chloracetate in anhydrous butyl alcohol remaining in the reaction vessel is heated further at atmospheric pressure while stirring; the temperature in the reaction vessel rises slowly from 118° C., and the formation of glycollic acid butyl ester takes place with the separation of potassium chloride.

When the greater part of the excess of butyl alcohol has distilled off and the temperature in the body of the still has risen to from 130° to 140° C. the whole is cooled, separated from the precipitated potassium chloride and the mixture of ester and butyl alcohol is subjected to fractional distillation with the employment of a vacuum. In this manner the glycollic acid butyl ester is obtained in a very pure form and in a yield of from 85 to 90 per cent of theoretical yield.

Example 2

20 kilograms of anhydrous sodium chloracetate are heated for from 3 to 4 hours at from 120° to 130° C. with 50 liters of anhydrous ethyl alcohol in a stirring autoclave. The reaction product is then freed from sodium chloride by filtering by suction and is fractionally distilled. In this manner the glycollic acid ethyl ester is obtained in good yields.

*Example 3*

265 kilograms of anhydrous potassium mono-chloracetate are heated together with 350 kilograms of allyl alcohol for 8 hours under reflux while stirring and boiling the mixture. After cooling, potassium chloride is separated by filtration and the reaction product is subjected to fractional distillation in vacuo. Glycollic allyl ester, boiling at from 66° to 67° C. at 10 millimeters mercury gauge, is obtained in a yield of 80 per cent of the theoretical yield.

*Example 4*

132.5 kilograms of anhydrous potassium mono-chloracetate are mixed with 425 kilograms of 1.3-butylene glycol and the mixture is heated while stirring for from 2 to 3 hours at 130° C. After cooling, potassium chloride is separated and remainders of the glycol are distilled off in vacuo. The remaining glycollic ester of 1.3-butylene glycol is a water-soluble, viscous liquid which cannot be distilled in vacuo without decomposition.

What I claim is:—

1. The process for the production of glycollic acid esters which comprises heating a dry alkaline salt of mono-chloracetic acid, which is free from water of crystallization, with an aliphatic alcohol in the absence of an esterifying agent.

2. The process for the production of glycollic acid esters which comprises heating a dry alkaline salt of mono-chloracetic acid, which is free from water of crystallization, with an aliphatic alcohol at superatmospheric pressure in the absence of an esterifying agent.

3. The process for the production of glycollic acid esters which comprises heating a dry alkaline salt of mono-chloracetic acid, which is free from water of crystallization, with an aliphatic alcohol to a temperature at least equal to the boiling point of the alcohol employed, in the absence of an esterifying agent.

4. The process for the production of glycollic acid esters which comprises heating a dry alkali metal salt of mono-chloracetic acid, which is free from water of crystallization, with an aliphatic alcohol in the absence of an esterifying agent.

5. The process for the production of glycollic acid esters which comprises heating a dry alkali metal salt of mono-chloracetic acid, which is free from water of crystallization, with an aliphatic alcohol to a temperature at least equal to the boiling point of the alcohol employed, in the absence of an esterifying agent.

6. The process for the production of glycollic acid esters which comprises heating a dry alkali metal salt of mono-chloracetic acid, which is free from water of crystallization, with an aliphatic alcohol in a closed vessel and in the absence of an esterifying agent.

In testimony whereof I have hereunto set my hand.

WOLFGANG BUELOW.